United States Patent
Hara et al.

(10) Patent No.: US 9,892,107 B2
(45) Date of Patent: Feb. 13, 2018

(54) ASSOCIATING MENTIONED ITEMS BETWEEN DOCUMENTS

(71) Applicant: International Business Machines Corporation, Armonk, NY (US)

(72) Inventors: Yusuke Hara, Tokyo (JP); Masatoshi Nogo, Kanagawa (JP); Eiichi Tazoe, Tokyo (JP)

(73) Assignee: International Business Machines Corporation, Armonk, NY (US)

( * ) Notice: Subject to any disclaimer, the term of this patent is extended or adjusted under 35 U.S.C. 154(b) by 158 days.

(21) Appl. No.: 14/258,668

(22) Filed: Apr. 22, 2014

(65) Prior Publication Data
US 2015/0039985 A1 Feb. 5, 2015

(30) Foreign Application Priority Data
Jul. 31, 2013 (JP) ................................. 2013-158457

(51) Int. Cl.
*G06F 17/00* (2006.01)
*G06F 17/24* (2006.01)

(52) U.S. Cl.
CPC .......... *G06F 17/245* (2013.01); *G06F 17/243* (2013.01)

(58) Field of Classification Search
CPC ...... G06F 17/211; G06F 17/24; G06F 17/243; G06F 17/27
USPC .......................... 715/200, 212, 220, 273, 277
See application file for complete search history.

(56) References Cited

U.S. PATENT DOCUMENTS

| | | | |
|---|---|---|---|
| 6,327,387 B1 * | 12/2001 | Naoi | G06K 9/2054 |
| | | | 382/173 |
| 6,643,644 B1 | 11/2003 | Furusho | |
| 6,865,720 B1 * | 3/2005 | Otani | G06F 17/245 |
| | | | 715/219 |
| 7,596,577 B2 | 9/2009 | Coulombe | |
| 7,792,829 B2 * | 9/2010 | Brill | G06F 17/30554 |
| | | | 707/728 |
| 8,594,996 B2 * | 11/2013 | Liang | G06F 17/278 |
| | | | 704/10 |

(Continued)

FOREIGN PATENT DOCUMENTS

| | | |
|---|---|---|
| JP | 07334574 A | 12/1995 |
| JP | 0010103 A1 | 2/2000 |

(Continued)

OTHER PUBLICATIONS

Takeuchi et al, "Document Artifact Analysis in Software Development," Computer Software, Japan Society for Software Science and Technology, Jan. 25, 2013, vol. 30, No. 1, pp. 53-64, English Abstract.

*Primary Examiner* — Stephen Hong
*Assistant Examiner* — Gregory Vaughn
(74) *Attorney, Agent, or Firm* — Peter J. Edwards

(57) ABSTRACT

A document processor for associating mentioned items with each other in two documents. A conversion unit converts at least a portion of mentioned items expressed in table format among the mentioned items included in the two documents. An association processing unit associates mentioned items with each other in the two documents including at least some mentioned items converted to text format. The conversion unit converts each of a plurality of cells included in the mentioned items expressed in table format to separate mentioned items in text format.

14 Claims, 13 Drawing Sheets

(56) References Cited

U.S. PATENT DOCUMENTS

| | | | | |
|---|---|---|---|---|
| 8,966,457 | B2 * | 2/2015 | Ebcioglu | G06F 17/5045 |
| | | | | 716/105 |
| 9,170,918 | B2 * | 10/2015 | Matsumoto | G06F 11/3608 |
| 2002/0034328 | A1 * | 3/2002 | Naoi | G06K 9/2054 |
| | | | | 382/176 |
| 2005/0289134 | A1 * | 12/2005 | Noguchi | H04L 67/02 |
| 2006/0173834 | A1 * | 8/2006 | Brill | G06F 17/30554 |
| 2007/0094256 | A1 * | 4/2007 | Hite | G06F 17/2785 |
| 2008/0221950 | A1 * | 9/2008 | Hirata | G06Q 10/0639 |
| | | | | 705/7.38 |
| 2009/0144609 | A1 * | 6/2009 | Liang | G06F 17/21 |
| | | | | 715/230 |
| 2012/0011487 | A1 * | 1/2012 | Matsumoto | G06F 11/3608 |
| | | | | 717/104 |
| 2013/0125097 | A1 * | 5/2013 | Ebcioglu | G06F 17/5045 |
| | | | | 717/136 |
| 2013/0318426 | A1 * | 11/2013 | Shu | G06F 17/243 |
| | | | | 715/226 |

FOREIGN PATENT DOCUMENTS

| | | | |
|---|---|---|---|
| JP | 2000259658 | A | 9/2000 |
| JP | 2004252655 | A | 9/2004 |
| JP | 2007004735 | A | 1/2007 |
| JP | 2008059428 | A | 3/2008 |
| JP | 2008077322 | A | 4/2008 |
| JP | 2008537831 | A | 9/2008 |
| JP | 2008282227 | A | 11/2008 |
| JP | 2009289024 | A | 12/2009 |
| JP | 2013020437 | A | 1/2013 |
| JP | 2013105321 | A | 5/2013 |

* cited by examiner

Table 1: XXX Configuration

| Item | Column 1 | Column 2 | Column 3 |
|------|----------|----------|----------|
| Row 1 | Cell 1-1 | Cell 1-2 | Cell 1-3 |
| Row 2 | Cell 2-1 | Cell 2-2 | Cell 2-3 |
| Row 3 | Cell 3-1 | Cell 3-2 | Cell 3-3 |

FIG. 7

Table 2: Policy For

| | Ensuring Safety Oversight | Verification | Evaluation |
|---|---|---|---|
| Purpose | Perform Necessary Process | ... | ... |
| Result | Oversight Report | Verification Report | Evaluation Report |
| Responsibility | Adequate Evaluation of Process | ... | ... |
| Period | Time Necessary For Process | ... | ... |

FIG. 8

(a) Table 1: xxx Values (units: kg)

| Item | Column 1 | Column 2 | Column 3 |
|---|---|---|---|
| Row 1 | 200 | 180 | 150 |
| Row 2 | 110 | 80 | 140 |
| Row 3 | 130 | 60 | 130 |

(b) Table 1: xxx Values

| Item | Column 1 (kg) | Column 2 (kg) | Column 3 (kg) |
|---|---|---|---|
| Row 1 | 200 | 180 | 150 |
| Row 2 | 110 | 80 | 140 |
| Row 3 | 130 | 60 | 130 |

(c) Table 1: Maximum xxx Values

| Item | Column 1 (kg) | Column 2 (kg) | Column 3 (kg) |
|---|---|---|---|
| Row 1 | 200 | 180 | 150 |
| Row 2 | 110 | 80 | 140 |
| Row 3 | 130 | 60 | 130 |

(d) Table 1: xxx Terms

| Item | Column 1 | Column 2 | Column 3 |
|---|---|---|---|
| Row 1 | $200 \geq a > 110$ | $180 \geq b > 80$ | $150 \geq c > 140$ |
| Row 2 | $110 \geq a > 50$ | $80 \geq b > 60$ | $140 \geq c > 130$ |
| Row 3 | $50 \geq a$ | $60 \geq b$ | $130 \geq c$ |

FIG. 9

Table 1: xxx Configuration

| Item | Column 1 | Column 2 | Column 3 |
|------|----------|----------|----------|
| Row 1 | ○ | ○ | |
| Row 2 | | ○ | |
| Row 3 | | | ○ |

FIG. 10

Table 1: xxx Configuration

| Item | Column 1 | Column 2 | Column 3 |
|------|----------|----------|----------|
| Row 1 | + + | + + | + + |
| Row 2 | + | + | ○ |
| Row 3 | + | + | + |

FIG. 11

Table 1: xxx Configuration

| Large Item | Middle Item | Small Item | Column 1 |
|---|---|---|---|
| Cell 1-1 | Cell 1-2 | Cell 3-1 | Cell 4-1 |
| | Cell 2-2 | Cell 3-2 | Cell 4-2 |
| | | Cell 3-3 | Cell 4-3 |
| Cell 1-2 | Cell 2-3 | Cell 3-4 | Cell 4-4 |

FIG. 12

Table 1: xxx Configuration

| | Column A | | Column B | |
|---|---|---|---|---|
| | Column A-1 | Column A-2 | Column B-1 | Column B-2 |
| Row 1 | Cell 1-1 | Cell 1-2 | Cell 1-2 | Cell 1-3 |
| Row 2 | Cell 2-1 | Cell 2-2 | Cell 2-2 | Cell 2-3 |
| Row 3 | Cell 3-1 | Cell 3-2 | Cell 3-2 | Cell 3-3 |

Table 1: System Design Analysis

| Technique | ASIL | | | |
|---|---|---|---|---|
| | A | B | C | D |
| Deductive Analysis | 0 | + | + + | + + |
| Inductive Analysis | + + | + + | + + | + + |

ASSOCIATING MENTIONED ITEMS BETWEEN DOCUMENTS

PRIORITY

This application claims priority to Japanese Patent Application No. 2013-158457, filed Jul. 31, 2013, and all the benefits accruing therefrom under 35 U.S.C. § 119, the contents of which in its entirety are herein incorporated by reference.

BACKGROUND

The present invention relates to a document processor for associating mutually mentioned items between two documents.

Requirement management systems establish links between character strings in a number of requirement management documents. In these systems, however, a user has to register beforehand all relationships between one requirement management document and another requirement management document. Also, links sometimes cannot be established correctly when the requirement management documents include tables.

SUMMARY

Embodiments include a system, method and computer program product for associating mentioned items with each other in two documents. A conversion unit converts at least a portion of mentioned items expressed in table format among the mentioned items included in the two documents. An association processing unit associates mentioned items with each other in the two documents including at least some mentioned items converted to text format. The conversion unit converts each of a plurality of cells included in the mentioned items expressed in table format to separate mentioned items in text format.

This summary of the present invention is not intended to enumerate all of the required characteristics of the present invention. The present invention may be realized by any combination or sub-combination of these characteristics.

BRIEF DESCRIPTION OF DRAWINGS OF THE SEVERAL VIEWS OF THE DRAWINGS

FIG. 7 shows a specific example of a converted table in the embodiment.

FIG. 8 shows examples of numerical quantities and numerical expression tables in the embodiment.

FIG. 9 shows an example of a symbol table in the embodiment.

FIG. 10 shows an example of a symbol table in the embodiment.

FIG. 11 shows another example of mentioned items in table format in the embodiment.

FIG. 12 shows another example of mentioned items in table format in the embodiment.

DETAILED DESCRIPTION

The following is an explanation of the present invention with reference to an embodiment of the present invention. However, the present embodiment does not limit the present invention in the scope of the claims. Also, all combinations of characteristics explained in the embodiment are not necessarily required in the technical solution of the present invention.

Embodiments may be realized in a document processor which reduces the burden on users of a system for associating documents such as a requirement management system, and which increases the accuracy of requirement management document processing. A first aspect of an illustrative embodiment includes a system, method, and computer program product storing non-transitory instructions executable by a computer to cause the computer to associate mentioned items with each other in two documents. The document processor includes a conversion unit for converting at least a portion of mentioned items expressed in table format among the mentioned items included in the two documents, and an association processing unit for associating mentioned items with each other in the two documents including at least some mentioned items converted to text format.

Figure 1:
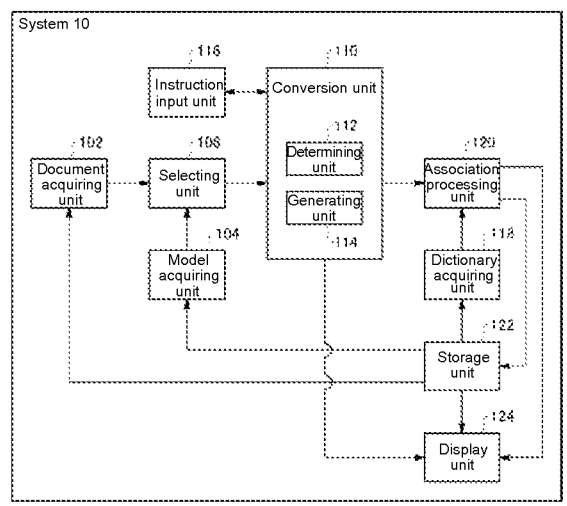
FIG. 1 shows the configuration of a system for associating mentioned items with each other in two documents in an embodiment.

FIG. 1 shows the configuration of a system 10 for associating mentioned items with each other in two documents in an embodiment. The system 10 is equipped with a document acquiring unit 102, model acquiring unit 104, selecting unit 106, conversion unit 110, instruction input unit 116, dictionary acquiring unit 118, association processing unit 120, storage unit 122, and display unit 124.

The document acquiring unit 102 acquires a plurality of documents from a storage device such as a storage unit 122 incorporated into or connected externally to the system 10, or may receive a number of documents inputted directly by a user via a network. The document acquiring unit 102 supplies the acquired documents to the selecting unit 106.

The model acquiring unit 104 acquires a model defining whether or not mentioned items are to be associated between certain document types. For example, the model acquiring unit 104 acquires a model from the storage unit 122 defining the relationships between a number of document types related to requirement management (for example, a hierarchical relationship between document types). The model acquiring unit 104 may acquire a model from a storage device such as a storage unit incorporated into or connected externally to the system 10, or may receive a model inputted directly by a user via a network. The model acquiring unit 104 supplies the acquired model to the selecting unit 106.

The selecting unit 106 acquires a number of documents from the document acquiring unit 102, and selects a second document as a target from among the documents to be associated with a first document serving as the association source on the basis of the model acquired from the model acquiring unit 104.

For example, the selecting unit 106 acquires at least two types to be associated with the first type of the first document, and selects from the mentioned items in the first document each of a number of second documents assigned to a second type as documents to be associated. The selecting unit 106 supplies the first document and the second document to the conversion unit 110.

The conversion unit 110 receives the first document and the second document to be associated from the selecting unit 106, and converts at least some of the mentioned items expressed in table format to mentioned items in text format among the mentioned items included in the first document and the second document. The conversion unit 110 has a determining unit 112 and a generating unit 114.

The determining unit 112 detects mentioned items expressed in table format inside the first document and the second document, and determines the type of table including the detected mentioned items expressed in table format. The determining unit 112 supplies the determined table type to the generating unit 114.

The generating unit 114 receives information on the determined type of table from the determining unit 122, and generates text in accordance with the determined type of table. For example, the generating unit 114 converts each of the cells included in the mentioned items expressed in table format into individual mentioned items in text format. The generating unit 114 includes text obtained from the conversion of the mentioned items expressed in table format in the first document and the second document instead of the determined mentioned items expressed in table format, and supplies the documents to the association processing unit 120.

The instruction input unit 116 receives instructions on mentioned items not to be converted to text format from the conversion unit 110 among the mentioned items expressed in table format in the first document and the second document. The instruction input unit 116 supplies mentioned items in table format having instructions not to be converted to text format to the conversion unit 110 so the mentioned items having these instructions are not converted to text format by the conversion unit 110.

The dictionary acquiring unit 118 acquires dictionary data defined by the degree of similarity between keywords from the storage unit 122. The dictionary acquiring unit 118 supplies dictionary data acquired in response to a request to the association processing unit 120.

The association processing unit 120 associates mentioned items with each other in two documents. For example, the association processing unit 120 acquires dictionary data from the dictionary acquiring unit 118, and determines whether or not to associate mentioned items in the first document and the second document with each other on the basis of the degree of similarity defined by the dictionary data. The association processing unit 120 stores the results of associating mentioned items in the first document and the second document with each other in the storage unit 122.

The storage unit 122 stores documents, models, associated mentioned items in documents, and dictionary data in the storage unit 122. The storage unit 122 may store, as dictionary data, data related to the similarities between keywords and data related to symbols used in tables. The storage unit 122 may be the main storage device or the auxiliary storage device inside the system 10. The storage unit 122 may also be a storage device external to the system 10. The storage unit 122 may be a single storage device or a number of storage devices.

The display unit 124 reads information on associated mentioned items in a number of documents from the storage unit 122, and displays the information on a display screen. The display unit 124 may also display on the screen the results of an impact analysis on a number of documents.

Because the system 10 in the present embodiment selects two documents from among a number of documents for mentioned item association on the basis of a model, the user does not have to register the relationships between documents beforehand.

Also, the system 10 in the present embodiment converts mentioned items in table format into text format based on the type of table, even when one of the first document and the second document includes mentioned items expressed in table format. By associating mentioned items between each other in documents including mentioned items converted from table format to text format, the system 10 can associate mentioned items in the documents with each other correctly and display the results for the user to review.

Figure 2:
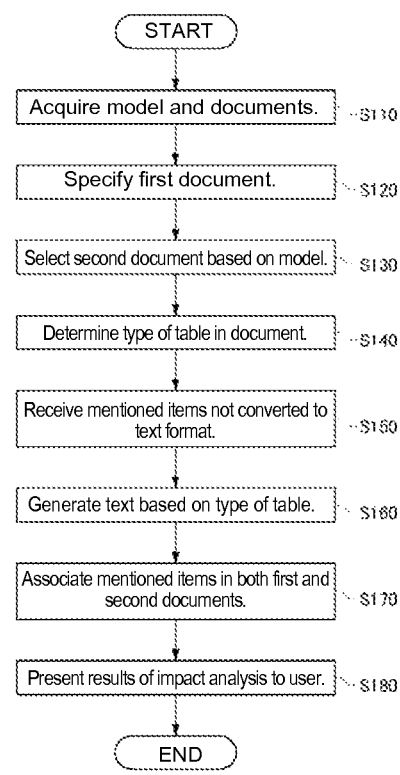
FIG. 2 shows the processing flow performed by the system for associating mentioned items with each other in two documents in the embodiment.

FIG. 2 shows the processing flow executed by the system 10 in the present embodiment. In the present embodiment, the system 10 executes the process in blocks S110 through S180.

First, in block S110, the system 10 acquires a model and a number of documents. For example, the document acquiring unit 102 acquires from the storage unit 122 a number of documents such as requirement definition documents and specifications documents related to requirement management in systems development. The document acquiring unit 102 supplies the acquired documents to the selecting unit 106.

The model acquiring unit 104 acquires a model related to requirement management from the storage unit 122. The model acquired by the model acquiring unit 104 includes relationships between document types that have been defined beforehand. The model may include information on the direction of associations between document types such as information indicating the hierarchical relationship between document types. The model acquiring unit 104 supplies the acquired model to the selecting unit 106.

Next, in block S120, the selecting unit 106 specifies the first document to serve as the association source among the documents. For example, the selecting unit 106 may specify a document that has been created or edited by the user as the first document whose mentioned items are to be associated with another document. The selecting unit 106 may acquire the specified first document directly from the user.

Next, in block S130, the selecting unit 106 selects a second document from among the documents to be associated with the first document based on the model. For example, the selecting unit 106 may acquire the document type from each document acquired by the document acquiring unit 102. A document type may be acquired by the selecting unit 106 from the file name, the subtitle, headers, and/or attribute data in the document.

Keywords and document types may be associated and stored beforehand, and the selecting unit 106 may extract keywords from the file name of a document and acquire the document type corresponding to the keywords. Alternatively, the selecting unit 106 may acquire data on the document type of each document from the document acquiring unit 102 along with the documents themselves.

Next, the selecting unit 106 acquires as the second type to be associated with the first type at least one specified second type related to the first type assigned to the first document according to the hierarchical relationship of document types in the model.

For example, the selecting unit 106 acquires, as the second type, the type above and/or below the first type in the hierarchy of the model. Instead of or in addition to this, the selecting unit 106 may acquire, as the second type, a test document positioned at the same level as the first type in the model. When the first type is a test document, the selecting unit 106 may acquire, as the second type, a document type on the same level for a test.

The selecting unit 106 selects a second document assigned to the second type among the documents as the document whose mentioned items are to be associated with those of the first document. The selecting unit 106 supplies the documents selected as the first document and the second document to the conversion unit 110.

Next, in block S140, the conversion unit 110 receives the first document and the second document from the selecting unit 106, and determines the types of table included in the first document and the second document.

First, the determining unit 112 in the conversion unit 110 may detect mentioned items expressed in table format among the mentioned items in the first document and the second document. Next, the determining unit 112 determines the types of tables for the mentioned items expressed in table format. The determining unit 112 may determine the type of a table based on whether the cells in the table contain sentences, quantities, marks, units, numerical expressions and/or character strings.

For example, the determining unit 112 may determine that the type of a table is a "sentence table" if the cells of the table include terminal punctuation such as periods, a "numerical quantity" if the cells of the table contain quantities, a "symbol table" if the cells of the table contain only marks, a "degree table" if the cells of the table contain units, a "numerical expression table" if the cells of the table contain numerical expressions indicating ranges, or a "character string table" if the cells of the table contain other character strings.

The determining unit 112 supplies the mentioned items expressed in table format in the first document and the second document as well as the determined types of table to the generating unit 114.

Next, in block S150, the instruction input unit 116 receives from the user instructions on the mentioned items not to be converted to text format among the mentioned items expressed in table format in the first document and the second document. For example, the conversion unit 110 may display a list of detected mentioned items expressed in table format on the display screen of the display unit 124. The instruction input unit 116 acquires instructions on the mentioned items not to be converted to text format from the user via check boxes on the display screen. The instruction input unit 116 supplies the mentioned items not to be converted to text format among the mentioned items expressed in table format to the conversion unit 110.

Next, in block S160, the generating unit 114 in the conversion unit 110 generates text depending on the type of table from the mentioned items expressed in table format in the first document and the second document. For example, the generating unit 114 generates text, depending on the type of table, including combinations of the header of the entire table, item names in the rows or columns, headers of the rows in the table, and/or headers of the columns in the table, and cell content or sentences corresponding to cell content. Specific examples of text generated from tables will be explained below.

Also, the generating unit 114 may generate one text from the table or, alternatively, may generate several texts which are displayed by the display unit 124 on the display screen so the user may select one of them. The generating unit 114 may associate text selected by the user with the type of table and store the associated text. Next, when a table of the same type is converted to text, the type of text selected by the user may be given priority and generated. For example, when the generating unit 114 displays several texts for the user, the type of text selected previously by the user may be displayed first, or text may be generated from the table using the type of text selected previously by the user instead of displaying multiple texts.

The generating unit 114 converts mentioned text expressed in table format in the first document and the second document into mentioned items in text format using the generated text. For example, tables included in the first document and the second document are converted to texts generated in accordance with the cells in the table.

The generating unit 114 does not convert mentioned items in an instruction received from the instruction input unit 116 into text format among the mentioned items expressed in table format in the first document and the second document. The generating unit 114 may delete mentioned items in an instruction received from the instruction input unit 116 from the first document and the second document. The generating unit 114 supplies the first document and the second document including text converted from tables to the association processing unit 120.

Next, in block S170, the association processing unit 120 associates mentioned items in the first document and the second document with each other on the basis of the degree of similarity between the mentioned items in the first document and the second document.

For example, the association processing unit 120 first extracts predetermined keywords from mentioned items in the first document. The association processing unit 120 acquires dictionary data from the dictionary acquiring unit 118, and acquires other keywords similar to the extracted keywords on the basis of the degree of similarity defined by the dictionary data. For example, the association processing unit 120 acquires, as a similar keyword, any keyword with a degree of similarity to the extracted keyword equal to or greater than a threshold value.

Next, the association processing unit 120 extracts mentioned item candidates in the second document including keywords similar to those in mentioned items in the first document for association with mentioned items in the first document. The association processing unit 120 may use the original keyword on which the similar keywords are based in addition to the similar keywords.

The association processing unit 120 determines what is to be associated with the first document among the mentioned items extracted from the second document. For example, the association processing unit 120 displays mentioned item candidates from the second document on the display screen of the display unit 124 to allow the user to determine which mentioned items from the second document are to be associated with mentioned items in the first document via checkboxes.

Here, the association processing unit 120 may prioritize the display of mentioned item candidates from the second document to be associated with mentioned items in the first document in accordance with the degree of similarity between keywords included in the mentioned items. For example, mentioned items from the second document with a degree of similarity exceeding the threshold value may be displayed according to the degree of similarity, or mentioned items from the second document may be displayed in a predetermined order according to the degree of similarity. The mentioned items may also be underlined or emphasized in a bold font. In this way, the system 10 prioritizes mentioned items more likely to be associated to facilitate selection by the user.

The association processing unit 120 may increase the defined degree of similarity in the dictionary data to keywords included in the mentioned items of the first document for keyword candidates selected by the user among the mentioned item candidates of the second document. In this way, the system 10 can reflect the degree-of-similarity judgments of the user in the dictionary data and improve the accuracy of mentioned item candidate extraction from the second document in subsequent operations.

Instead of having the user select mentioned items, the association processing unit 120 may associate mentioned item candidates in the second document including similar keywords with a high degree of similarity to mentioned items in the first document. The association processing unit 120 stores the associated results in the storage unit 122.

Next, in block S180, the display unit 124 displays the results of an impact analysis related to the first document on the display screen. For example, the display unit 124 displays mentioned items in another document associated directly and/or indirectly with mentioned items in the first document. In this way, the display unit 124 can present to the user the impact of editing the first document on the mentioned items in the other document.

In this way, the system 10 in the present embodiment can save the user time and effort when examining associated documents and making manual selections. For example, it can reduce the amount of time required to bring requirements into compliance with standards.

When a second document is selected among a number of documents to be associated with the first document, the system 10 selects a document related to the type adjacent to the document type of the first document in the predetermined direction in the model. Therefore, the association direction is uniform when two documents are associated. In this way, the system 10 can avoid associating mentioned items in inappropriate documents (for example, associating mentioned items in higher ranked documents with mentioned items in lower ranked documents as in the example shown in FIG. 16, or associating mentioned items in documents that are not directly adjacent to each other in terms of the hierarchy).

The system 10 also converts mentioned items in table format in the first document and the second document into text format according to the type of table. In this way, the system 10 can correctly associate mentioned items between documents.

Figure 3:
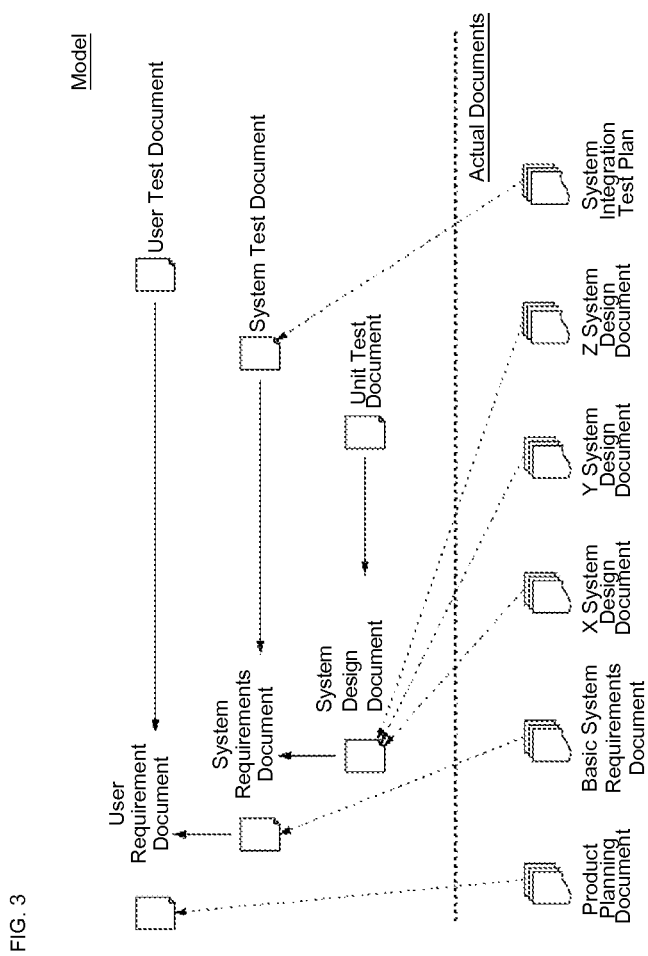
FIG. 3 shows an example of a model and documents in the embodiment.

FIG. 3 shows an example of a model in the embodiment and actually acquired documents. In block S110, the model acquiring unit 104 acquires a model including document types or meta-documents specifying the relationship between documents. For example, the model acquiring unit 104 acquires models including the type "user-required documents" describing user requirements, the type "system requirement documents" at a rank lower than "user-required documents" describing requests to be implemented in the system to realize user requirements, the type "system design documents" at a rank lower than "system requirement documents" describing system design items for realizing the requests in system requirement documents", the type "user test document" which is a test document corresponding to a "user-required document", the type "system test document" which is a test document corresponding to a "system requirement document", and the type "unit test document" which is a test document corresponding to a "system design document".

In block S110, the document acquiring unit 102 also acquires, as the number of documents, product planning documents, basic system requirement documents, system design documents, X system design documents, Y system design documents, Z system design documents, and system integration test plans.

In block S130, the selecting unit 106 acquires document types from, for example, the file names of the documents. For example, the selecting unit 106 acquires "user-required document" as the document type for a product planning document, "system requirement document" as the document type for a basic system requirement document, "system design document" as the document type for X system design documents, Y system design documents, Z system design documents, and "system test document" as the document type for a system integration test document.

Figure 4:
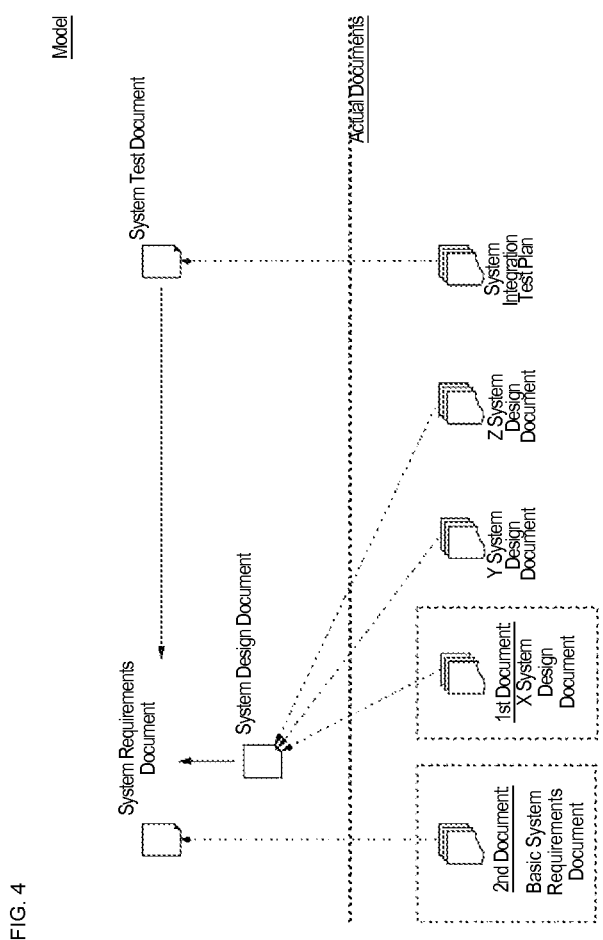
FIG. 4 shows an example of second document selection in the embodiment.

FIG. 4 shows an example of the selection of the second document in block S130 of the present embodiment. When an X system design document has been indicated as the first document, the selecting unit 106 acquires a "system requirement document" at a higher rank as the second document type or the type to be associated with a "system design document" as the first type related to the X system design document.

Next, the selecting unit 106 selects as the second document a basic system requirements document belonging to the second document type "system requirement document". When a system integrated test plan belonging to "system test document" has been acquired as the first document, the selecting unit 106 may select as the second document a basic systems requirement document belonging to "system requirement document" which is a test document on the same level as the type to be associated with a "system test document".

Figures 5, 6:
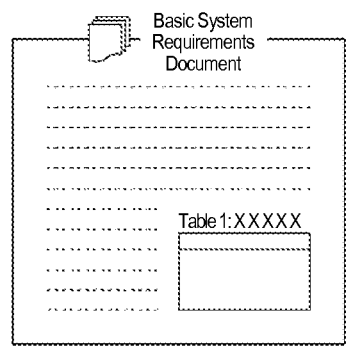
FIG. 5 shows an example of a document including mentioned items in table format in the embodiment.
FIG. 6 shows an example of mentioned items in table format in the embodiment.

FIG. 5 shows an example in the present embodiment of a document including mentioned items in table format. For example, either the first document or the second document (basic system requirements documents in the figure) does not have mentioned items expressed in table format embedded in the mentioned items expressed in text format. In block S140, the determining unit 112 detects mentioned items expressed in table format.

FIG. 6 shows an example in the present embodiment of mentioned items in table format. Mentioned items in table format include the overall header for the table ("Table 1: XXX Configuration"), the name of the rows or columns ("Item"), the column headers ("Column 1" through "Column 3"), the row headers ("Row 1" through "Row 3"), and cell content "Cell 1-1" through "Cell 3-3").

The determining unit 112 determines each element in the table. For example, the determining unit 112 may determine the cell in the first row and first row is "Item", the cells in the first row of the table other than "Item" are row headers, the cells in the first column other than "Item" are column headers, and the cells beginning with the cell in the second row and the second column of the table are cell content. Alternatively, the determining unit 112 may receive information from the user specifying each element in the table.

In block S140, the determining unit 112 determines the type of table of the mentioned items expressed in table format from the description of the cells identified as containing cell content, and in block S160 the generating unit 114 generates text according to the type of table.

For example, when the determining unit 112 has determined that the table in FIG. 6 is a "character string table", the generating unit 114 may generate, as mentioned items converted to text format, "cell n-m for row n and column m" (text 1) for each cell. (Here, n and m are natural numbers indicating the row number and column number.)

Also, the generating unit 114 may generate, as mentioned items converted to text format, "cell n-m for row n and column m" for each cell, "overall table header 'cell n-m' for row m and column n", "overall table header 'cell n-m' for column m and row n, and/or "cell n-m for row n in column m".

The generating unit 114 may add a description such as "Overall Table Header:" at the beginning of the generated text or in the generated text. When the overall table header is the table itself, such as "Table 1" or "Table 2", the generating unit 114 may generate text that omits a description representing the table itself. In the example shown in FIG. 6, the generating unit 114 may generate text such as "Cell 1-1 in Row 1, Column 1 of XXX Configuration" for cell 1-1.

The generating unit 114 may use any expression to indicate the end of the generated text. For example, the generating unit 114 may employ any terminal expression commonly used in the Japanese language. [Translator's Note: There are no English analogs for the examples cited in the original Japanese-language document].

For example, when the determining unit 112 has determined that the table in FIG. 6 is a "sentence table", the generating unit 114 may generate the text "Cell n-m" and include the content of each cell, or may instead generate a table similar to a string table.

FIG. 7 shows a specific example of a table converted in the present embodiment. For example, the determining unit 112 determines that the table in FIG. 7 related to safety procedures is a character string table. In the example shown in FIG. 7, the determining unit 112 generates the text "line m in column n of the overall table header is 'cell n-m'". More specifically, when the cell in the table related to the "oversight report" is converted, the generating unit 114 generates the text "The result of oversight of the policy for ensuring safety is an oversight report".

FIG. 8 shows examples in the embodiment of numerical quantities and numerical expression tables. The determining unit 112 determines that table including quantities, such as those in FIG. 8 (a) through FIG. 8 (c) are numerical quantities. The generating unit 114 detects single mentions of quantities in a table determined to be a numerical quantity, generates text for the cell similar to a character string table, and then generates text in which the unit of measurement is appended to the quantity in the text.

For example, in the table shown in FIG. 8 (a), the unit of measurement for the quantities in the overall table header is "kg". The generating unit 114 appends "kg" to the quantity in each cell of the table taken from the table in FIG. 8 (a), and generates text such as "200 kg in row 1, column 1" and "180 kg in row 1, column 2".

Similarly, in the table shown in FIG. 8(b), the unit of measurement "kg" for the quantities is included in a column header. The generating unit 114 deletes the unit of measurement "kg" for the quantities from the row header and from any description including this such as "(kg)". It then appends the unit of measurement "kg" to the quantities in each cell of the table, and generates text such as "200 kg in row 1, column 1" and "180 kg in row 1, column 2".

The table shown in FIG. 8 (c) is identical to the table in FIG. 8 (b) except that the description "maximum" has been included in the overall table header. The determining unit 112 determines descriptions in the table indicating upper limits such as "maximum" or "max", and in response the generating unit 114 may generate text in which the expression "or less" is appended to the quantities and unit of measurement.

For example, from the table in FIG. 8 (c), the generating unit 114 may generate text such as "200 kg or less in row 1, column 1" and "180 kg or less in row 1, column 2". Similarly, the determining unit 112 determines descriptions in the table indicating lower limits such as "minimum" or "min", and in response the generating unit 114 may generate text in which the expression "or more" is appended to the quantities and unit of measurement.

The determining unit 112 determines that tables including numerical expressions of range, such as the table in FIG. 8 (d), are numerical expression tables. For example, the determining unit may determine that a table including symbols such as "=", "≈", "≤", "≥", "<" or ">" in the cells of the table is a numerical expression table. Here, the generating unit 114 may generate text for each cell of a numerical expression table, such as "If row 1 is 'Cell 1-1' as the 'overall table header', the 'Item' is 'Column 1'". For example, from the table in FIG. 8 (d), the generating unit 114 may generate the text, "If row 1 is 200≥a>110 as the XXX condition, 'Table' is column 1."

Also, the generating unit 114 may generate, for each cell in the numerical expression table, the text "If 'Column 1' is 'Cell 1-1' as the 'overall table header', the 'Item' is 'Row 1'". Alternatively, the generating unit 114 may generate text from a numerical expression table similar to the method used for quantity tables.

FIG. 9 and FIG. 10 show examples of symbol tables in the present embodiment. The determining unit 112 determines that tables including marks such as those in FIG. 9 and FIG. 10 are symbol tables. The generating unit 114 may generate text according to the types of marks included in a symbol table. Here, the generating unit 114 may generate text according to the types of marks using dictionary data.

For example, the determining unit 112 determines that the table in FIG. 9, which includes marks such as "O" (or "X") in cells, is a symbol table, and queries the dictionary acquiring unit 118 for text corresponding to the marks. The dictionary acquiring unit 118 acquires text such as "present" for "O" from the dictionary data, and supplies this text to the generating unit 114.

Thus, the generating unit 114 generates text including "present" for the mark "O". For example, the generating unit 114 may generate text for the cell in row 1, column 1 of the table in FIG. 9, such as "Row 1 in column 1 is present", "Column 1 in row 1 is present", or "in the XXX configuration, row 1, column 1 is present". The generating unit 114 does not have to generate text for cells that do not include the mark "O".

When the cells of a table include marks indicating degree or extent, the generating unit 114 generates text that also indicates the degree or extent corresponding to a mark. For example, the determining unit 112 determines that the table in FIG. 10, which includes symbols such as "+", "++" and/or "0" indicating degree, is a symbol table, and the generating unit 114 generates text such as "recommended" for "+", "strongly recommended" for "++", and "not recommended" or "contrary to usage" for "0".

For example, the generating unit 114 may generate, for the cell at row 1, column 1 of the table in FIG. 10, text such as "strongly recommended for column 1 in row 1", "strongly recommended in row 1 for the item in column 1", "strongly recommended for row 1 in column 1", "strongly recommended in column 1 for the item in row 1", "the method is strongly recommended in row 1, column 1", "the method is strongly recommended for the item in row 1, column 1", "XXX configuration is strongly recommended in row 1, column 1".

The generating unit 114 does not have to generate text for cells not including "+", "++" or, "0".

FIG. 11 shows another example of mentioned items in table format in the present embodiment. The generating unit 114 may generate text from a table in which the cell content is ordered hierarchically. For example, the generating unit 114 may generate text including cell content in the top level as conditions for cells in the lower levels of a hierarchically ordered table. In one example, the generating unit 114 may generate text for cell 3-1 in FIG. 11 such as "for XXX configuration, column 1 is cell 4-1 when cell 1-2 of cell 1-1 is cell 3-1".

FIG. 12 shows another example of mentioned items in table format in the present embodiment. The generating unit 114 may generate text from a table in which the column headers and/or row headers are ordered hierarchically. For example, the generating unit 114 may generate text including the content of hierarchically ordered column headers and/or row headers as conditions from a table including hierarchically ordered column headers and/or row headers. For example, text may be generated for Cell 1-1 of FIG. 12 such as "for XXX configuration, row 1 is cell 1-1 when column A is column A-1" or "for XXX configuration, cell 1-1 is row 1 when column A is column A-1".

Figures 13, 14:
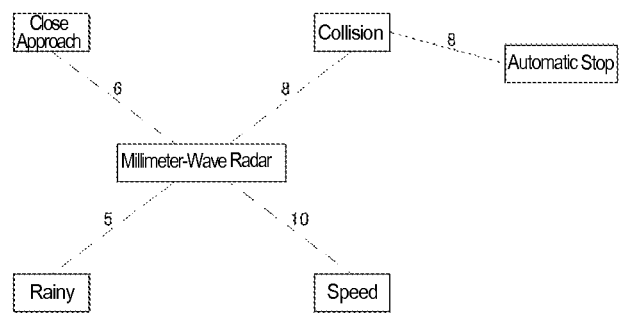
FIG. 13 shows a specific example of a table including marks representing degree and in which the column headings are hierarchical.
FIG. 14 shows an example of the degrees of similarity between keywords as defined by dictionary data.

FIG. 13 shows a specific example in which the table includes column headers that are hierarchically ordered and marks indicating degree or extent. Here, the generating unit 114 may generate text for the cell corresponding to "deductive analysis" and "D" in the table of FIG. 13 such as "deductive analysis is strongly recommended as the method of system design analysis when ASIL is D".

FIG. 14 shows an example of the degrees of similarity between keywords as defined by dictionary data. As shown in the figure, dictionary data includes keywords similar to each other and the degrees of similarity between the similar keywords. For example, the keyword "millimeter-wave radar" has a degree of similarity to "rainy" of 5, a degree of similarity to "close approach" of 6, a degree of similarity to "speed" of 10, and a degree of similarity to "collision" of 8.

In block S170, for example, the association processing unit 120 extracts the keywords "rainy", "speed", "collision" and "close approach" with a degree of similarity of five or more to keyword "millimeter-wave radar" included in a mentioned item in the first document on the basis of the illustrated dictionary data. In this way, the association processing unit 120 specifies the keyword "millimeter-wave radar" and similar words "rainy", "speed", "collision" and "close approach" as candidates for association of mentioned items in the second document to mentioned items in the first document.

Here, the association processing unit 120 may present other keywords similar to the keywords "millimeter-wave radar" for selection by the user. For example, the association processing unit 120 may display the keywords "rainy", "speed", "collision" and "close approach" as candidates resembling the keyword "millimeter-wave radar" on the display screen of the display unit 124 so the user may select any of the keywords for extraction from mentioned items in the second document.

Figure 15:
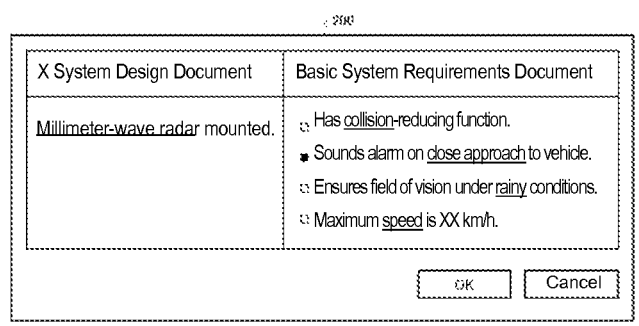
FIG. 15 shows an example of mentioned item candidates in a second document displayed on a screen.

FIG. 15 shows an example of mentioned item candidates in the second document displayed by the association processing unit 120 on the display screen 200 of the display unit 124 in block S170. As shown in the figure, the association processing unit 120 displays "millimeter-wave radar mounted" in a mentioned item from X system design document serving as the first document, and mentioned item candidates associated with this mentioned item from the basic system requirements document serving as the second document: "has collision-reducing function", "sounds alarm on close approach to vehicle in front", "ensures field of vision under rainy conditions" and "maximum speed is XX km/h".

Here, the association processing unit 120 displays a checkbox for each mentioned item candidate on the screen, acquires selections from the user via the checkboxes, and associates the acquired candidates with the mentioned item from the first document. For example, the association processing unit 120 associates the mentioned item "sounds alarm on close approach to vehicle in front" selected by the user from the second document with the mentioned item "millimeter-wave radar mounted" from the first document.

Figure 16:
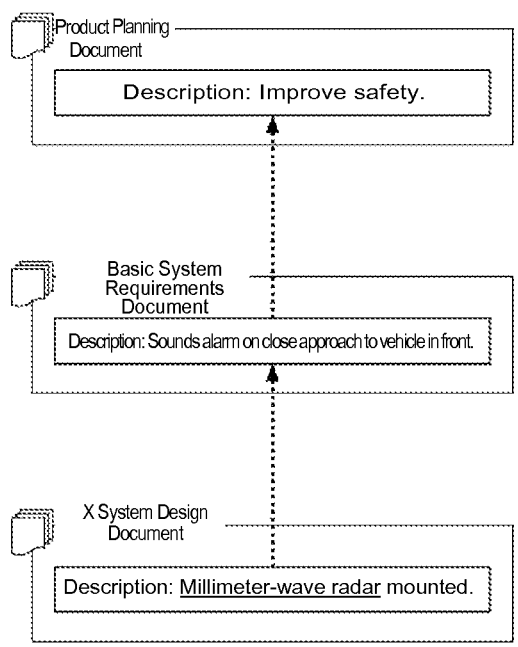
FIG. 16 shows an example of an impact analysis displayed by a display unit 124.

FIG. 16 shows an example of an impact analysis displayed by the display unit 124. The association processing unit 120 associates a basic system requirements document as the second document to the X system design document designated as the first document, and associates a product planning document as the second document to the basic system requirements document designated as the first document.

For example, the association processing unit 120 associates the mentioned item "millimeter-wave radar mounted" from the X system design document to mentioned item "sounds alarm on close approach to vehicle in front" in the basic system requirements document arranged located at a higher level than the X system design document, and associates the mentioned item "sounds alarm on close approach to vehicle in front" in the basic system requirements document with the mentioned item "improves safety" in the product planning document located at a higher level than the basic system requirements document.

The display unit 124 may display the relationships between mentioned items in the documents shown in FIG. 16 as a result of the associations created by the association processing unit 120. In this way, the system 10 can display the impact of document editing performed by the user on the mentioned items in other documents in a way that is easier to understand.

Figure 17:
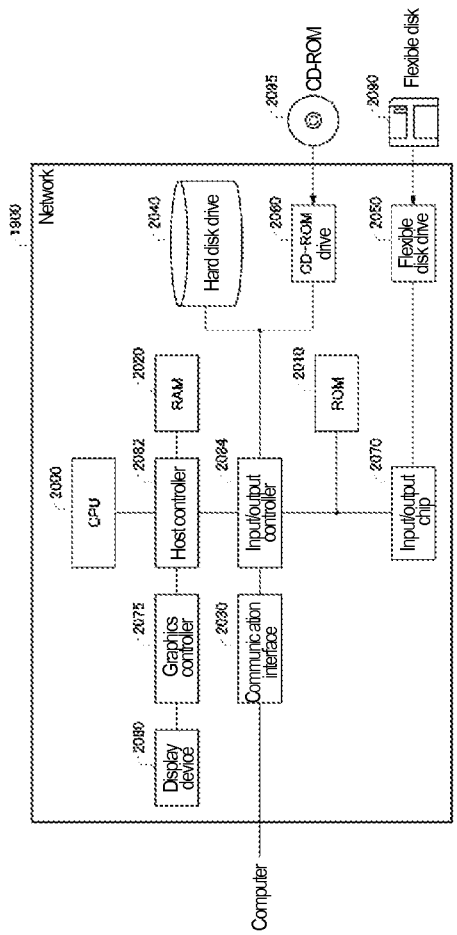
FIG. 17 shows an example of a hardware configuration for the computer 1900.

FIG. 17 shows an example of a hardware configuration for the computer 1900 serving as the system 10 in the embodiment. The computer 1900 in the present embodiment is equipped with a CPU peripheral portion having a CPU 2000, RAM 2020, graphics controller 2075 and display device 2080 connected to each other by a host controller 2082, an input/output portion having a communication interface 2030, a hard disk drive 2040 and a DVD drive 2060 connected to the host controller 2082 by an input/output controller 2084, and a legacy input/output portion having a ROM 2010, flexible disk drive 2050, and input/output chip 2070 connected to the input/output controller 2084.

The host controller 2082 is connected to RAM 2020, a CPU 2000 accessing the RAM 2020 at a high transfer rate, and a graphics controller 2075. The CPU 2000 is operated on the basis of a program stored in the ROM 2010 and the RAM 2020, and controls the various units.

The graphics controller 2075 acquires the image data generated in the frame buffer of the RAM 2020 by the CPU 2000 and other units, and displays this image data on the display device 2080. Alternatively, the graphics controller 2075 can include a frame buffer for storing image data generated by the CPU 2000 and other units.

The input/output controller 2084 is connected to a host controller 2082, a communication interface 2030 serving as a relatively high-speed input/output device, a hard disk drive 2040, and a CD-ROM drive 2060. The communication interface 2030 communicates with the other devices via a wired or wireless network.

The communication interface also functions as hardware in the system 10 for communicating with the outside. The hard disk drive 2040 stores the programs and data used by the CPU 2000 in the computer 1900. The CD-ROM drive 2060 reads programs and data from the CD-ROM 2095 and provides them to the hard disk drive 2040 via the RAM 2020.

The input/output controller 2084 is connected to the ROM 2010, the flexible disk drive 2050, and the relatively low-speed input/output device of the input/output chip 2070. The ROM 2010 stores the boot program executed by the computer 1900 at startup and/or programs relying on hardware in the computer 1900.

The flexible disk drive 2050 reads programs or data from a flexible disk 2090, and provides the programs and data to the hard disk drive 2040 via the RAM 2020. The input/output chip 2070 connects the flexible disk drive 2050 to the input/output controller 2084, and various types of input/output device are connected to the input/output controller 2084 via a parallel port, serial port, keyboard port, or mouse port, etc.

A program provided to the hard disk drive 2040 via the RAM 2020 is stored on a recording medium such as a flexible disk 2090, CD-ROM 2095 or IC card, and provided by the user. A program is read from the recording medium, installed in the hard disk drive 2040 inside the computer 1900 via the RAM 2020, and executed by the CPU 2000.

Programs for the system 10 are installed in the computer 1900 to enable the computer 1900 to function as a document acquiring module, model acquiring module, selection module, conversion module, determination module, generation module, instruction input module, dictionary acquiring module, association processing module, and display module. These programs or modules may work with the CPU 2000 and other components to cause the computer 1900 to function as the document acquiring unit 102, model acquiring unit 104, selecting unit 106, conversion unit 110, determining unit 112, generating unit 114, instruction input unit 116, dictionary acquiring unit 118, association processing unit 120, and display unit 124.

The information processing steps written in these programs are specific means activated by reading the programs to the computer 1900 so that the software cooperates with the various types of hardware resources described above. These specific means function as the document acquiring unit 102, model acquiring unit 104, selecting unit 106, conversion unit 110, determining unit 112, generating unit 114, instruction input unit 116, dictionary acquiring unit 118, association processing unit 120, and display unit 124. These specific means realize operations and the processing of information in the computer 1900 of the present embodiment to construct a specific system 10 for this intended purpose.

For example, when the computer 1900 communicates with an external device, the CPU 2000 executes the communication program loaded in the RAM 2020, and instructs the communication interface 2030 in the communication processing on the basis of the processing content described in the communication program.

The communication interface 2030 is controlled by the CPU 2000, and reads the transmitted data stored in the transmission buffer region of a memory device such as the RAM 2020, hard disk drive 2040, flexible disk 2090 or CD-ROM 2095, or writes reception data received from the network to a reception buffer region of the storage device.

In this way, the communication interface 2030 transfers transmitted and received data to a storage device such as storage unit 122 using the direct memory access (DMA) method. Alternatively, the CPU 2000 transfers transmitted and received data by reading data from the source storage device or communication interface 2030, and transfers and writes data to the destination communication interface 2030 or storage device.

Also, the CPU 2000 writes all of the data or the necessary data to the RAM 2020 via, for example, a DMA transfer, from files or databases stored in the storage unit 122 or another external storage device such as a hard disk drive 2040, a CD-ROM drive 2060 (CD-ROM 2095) or a flexible disk drive 2050 (flexible disk 2090), and performs various types of processing on the data in the RAM 2020.

The CPU 2000 then writes the processed data to the storage unit 122 or another external storage device via, for example, a DMA transfer. Because the RAM 2020 temporarily stores the contents of the external storage device during this process, the RAM 2020 and the external storage device are generally referred to in the present embodiment as memory, a storage unit, or a storage device.

The various types of information in the programs, data, tables and databases of the present embodiment are stored in these memory devices, and are the targets of information processing. The CPU 2000 can hold some of the RAM 2020 in cache memory, and read and write data to the cache memory. Here, the cache memory performs some of the functions of the RAM 2020. Therefore, this division is excluded in the present embodiment. Cache memory is included in the RAM 2020, the memory, and/or the storage device.

The CPU 2000 also performs various types of processing on data read from the RAM 2020 including the operations, processing, condition determination, and information retrieval and substitution described in the present embodiment and indicated by a sequence of instructions in the program, and writes the results to the RAM 2020. For example, when performing a condition determination, the CPU 2000 compares various types of variables described in the present embodiment to other variables or constants to determine whether or not conditions such as greater than, less than, equal to or greater than, equal to or less than or equal to have been satisfied. When a condition has been satisfied (or not satisfied), the process branches to a different sequence of instructions or calls up a subroutine.

The CPU 2000 can also retrieve information stored in files and databases inside the memory device. For example, when a number of entries associating an attribute value for a second attribute to an attribute value for a first attribute, the CPU 2000 can retrieve an entry matching the conditions indicated by the attribute value of the first attribute among the number of entries stored in the storage device, and then obtain the attribute value of the second value associated with the first value satisfying a predetermined condition by reading the attribute value of the second attribute stored in the entry.

A program or module described above can be stored in a recording medium of an external unit. Instead of a flexible disk 2090 or a CD-ROM 2095, the recording medium can be an optical recording medium such as a DVD or CD, a magneto-optical recording medium such as MO, a tape medium, or a semiconductor memory such as an IC card. The recording medium can also be a storage device such as a hard disk or RAM provided in a server system connected to a dedicated communication network or the internet, and the program can be provided to the computer 1900 via the network.

The present invention was explained using an embodiment, but the technical scope of the present invention is not limited to the embodiment described above. The possibility of many changes and improvements to this embodiment should be apparent to those skilled in the art. Embodiments including these changes and improvements are within the technical scope of the present invention, as should be clear from the description of the claims.

The order of execution for operations, steps and processes in the devices, systems, programs and methods described in the claims, description and drawings was described using such terms as "previous" and "prior". However, these operations, steps and processes can be realized in any order as long as the output of the previous process is used by the subsequent process. The operational flow in the claims, description and drawing were explained using terms such as "first" and "next" for the sake of convenience. However, the operational flow does not necessarily have to be executed in this order.

What is claimed is:

1. A system comprising a processor, wherein the processor is configured to associate mentioned items with each other in two documents, the system further comprising:
   a conversion unit for converting at least a portion of mentioned items expressed in table format among the mentioned items included in the two documents into sentence format, the conversion unit comprising:
      a determining unit for determining the type of table in a mentioned item expressed in table format; and
      a generating unit for generating text in accordance with the determined type of table;
   dictionary acquiring unit for acquiring dictionary data defined by a degree of similarity between keywords; and
   an association processing unit for associating mentioned items with each other in the two documents including at least some mentioned items converted to sentence format; wherein the association processing unit determines whether or not mentioned items are to be associated with each other in part on the basis of the degree of similarity between the two documents as defined by dictionary data for the keywords included in the mentioned items.

2. The system according to claim 1 further comprising:
   a model acquiring unit for acquiring a model defining whether or not mentioned items are to be associated between certain document types; and
   a selecting unit for selecting a second document to be associated with a first document among a plurality of documents on the basis of the document type relationship between the first document and the second document as defined by the model, mentioned items in the selected first document and second document being associated with each other as the two documents.

3. The system according to claim 1, wherein the determining unit determines the type of table on the basis of whether the content of the cells of the table is text, character strings, or numerical expressions.

4. The system according to claim 3, wherein the generating unit, when the cells of the table include marks indicating degree, generates text representing the degree corresponding to the mark.

5. The system according claim 4 further comprising an instruction input unit for receiving an instruction for a mentioned item not to be converted to sentence format among the mentioned items expressed in table format, the conversion unit not converting to sentence format any mentioned item in table form having an instruction not to be converted to sentence format.

6. The system according to claim 1, wherein the association processing unit displays mentioned item candidates in the second document to be associated with mentioned items included in the first document and prompts the user to select at least one.

7. The system according to claim 6, wherein the association processing unit displays mentioned item candidates in the second document to be associated with mentioned items included in the first document according to priority on the basis of the degree of similarity between keywords included in the mentioned items.

8. The system according to claim 7, wherein the association processing unit increases the defined degree of similarity for any candidate selected by the user among the plurality of mentioned item candidates of the second document with keywords in the dictionary data included in the mentioned items of the first document.

9. The system of claim 1, wherein the portions of the mentioned items comprise keywords.

10. A computer program product for associating mentioned items with each other in two documents, the computer program product comprising a non-transitory computer readable storage medium having program instructions embodied therewith, the program instructions executable by a computer to cause the computer to:
    convert at least a portion of mentioned items expressed in table format among the mentioned items included in the two documents into separate natural language expressions in text format;
    acquire dictionary data defined by the degree of similarity between keywords;
    associate mentioned items with each other in the two documents including at least some mentioned items converted to separate natural language expressions in text format, wherein the determination of whether or not mentioned items are to be associated with each other is based in part on the degree of similarity between the two documents as defined by dictionary data for the keywords included in the mentioned items; and
    display mentioned item candidates in the second document to be associated with mentioned items included in the first document according to priority on the basis of the degree of similarity between keywords included in the mentioned items.

11. The computer program product of claim 10, wherein the program instructions are further executable to cause the computer to:

acquire a model defining whether or not mentioned items are to be associated between certain document types; and select a second document to be associated with a first document among a plurality of documents on the basis of the document type relationship between the first document and the second document as defined by the model, mentioned items in the selected first document and second document being associated with each other as the two documents.

12. The computer program product of claim 10 wherein the program instructions are further executable to cause the computer to:

determine the type of table in a mentioned item expressed in table format; and generate text in accordance with the determined type of table.

13. The computer program product of claim 10, wherein the portion of mentioned items comprises symbols.

14. A method comprising:

identifying a first document, wherein the first document is of a first document type and contains a first item expressed in sentence format;

identifying a second document, wherein the second document is of a second document type contains a second item expressed in table format;

identifying, using a model that specifies relationship between documents, a relationship between the first document type and the second document type;

determining, based on the identifying the relationship, to associate the first document and the second document;

associating, based on the determining to associate, the first item and second item, the associating comprising:

converting the second item from table format to sentence format;

identifying a first keyword in the first item and a second keyword in the second item expressed in sentence format;

obtaining first dictionary data, wherein the first dictionary data is associated with the first keyword;

obtaining second dictionary data, wherein the second dictionary data is associated with the second keyword; and determining that a degree of similarity between the first dictionary data the second dictionary data is above a threshold value; and displaying, based on the associating, the first item and the second item to a user.

* * * * *